United States Patent
Hu (12)

(10) Patent No.: US 12,546,475 B2
(45) Date of Patent: Feb. 10, 2026

(54) INJECTOR WITH FAIRING AND ANNULAR PASSAGE FOR HYDROGEN-DRIVEN GAS TURBINE ENGINE

(71) Applicant: PRATT & WHITNEY CANADA CORP., Longueuil (CA)

(72) Inventor: Tin Cheung John Hu, Markham (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/429,661

(22) Filed: Feb. 1, 2024

(65) Prior Publication Data

US 2024/0263784 A1    Aug. 8, 2024

Related U.S. Application Data

(60) Provisional application No. 63/482,819, filed on Feb. 2, 2023.

(51) Int. Cl.
*F23R 3/28* (2006.01)

(52) U.S. Cl.
CPC .............. *F23R 3/28* (2013.01); *F23R 3/286* (2013.01)

(58) Field of Classification Search
CPC .. F23R 3/286; F23R 3/28; F23R 3/283; F23R 3/14; F02C 7/22
See application file for complete search history.

(56) References Cited

U.S. PATENT DOCUMENTS

| | | | |
|---|---|---|---|
| 3,600,891 A * | 8/1971 | Gordon | F23R 3/28 60/741 |
| 4,150,539 A | 4/1979 | Rubins et al. | |
| 4,578,946 A | 4/1986 | Readman et al. | |
| 5,351,477 A * | 10/1994 | Joshi | F23D 17/002 60/737 |
| 5,813,232 A | 9/1998 | Razdan et al. | |
| 5,836,289 A | 11/1998 | Thring | |
| 7,017,329 B2 | 3/2006 | Farhangi et al. | |
| 8,413,445 B2 | 4/2013 | Poyyapakkam | |
| 10,415,830 B2 | 9/2019 | Inoue et al. | |

(Continued)

FOREIGN PATENT DOCUMENTS

WO    2017175958    10/2017

OTHER PUBLICATIONS

European Search Report for European Patent Application No. 24155603.4 mailed May 15, 2024.

*Primary Examiner* — Thomas P Burke

(74) *Attorney, Agent, or Firm* — Carlson, Gaskey & Olds, P.C.

(57) ABSTRACT

An injector for introducing hydrogen and air into a combustion chamber of a gas turbine engine includes a convergent-divergent nozzle head, a fairing, a fuel nozzle, and an air nozzle. The convergent-divergent nozzle head has in fluid communication in series a convergent section, a throat, and a divergent section. The fairing extends through the convergent section and through the throat to define an annular passage between the fairing and the convergent-divergent nozzle head that has an outlet in the divergent section. The fuel nozzle has multiple feed conduits that open to the annular passage for providing hydrogen fuel. The gas nozzle is upstream of the convergent-divergent nozzle head for providing gas into the annular passage.

11 Claims, 2 Drawing Sheets

(56) References Cited

U.S. PATENT DOCUMENTS

| | | | |
|---|---|---|---|
| 2005/0106520 A1* | 5/2005 | Cornwell | F23R 3/18 |
| | | | 431/9 |
| 2008/0104961 A1* | 5/2008 | Bunker | F23D 14/62 |
| | | | 60/737 |
| 2008/0163627 A1* | 7/2008 | ELKady | F23R 3/14 |
| | | | 60/737 |
| 2009/0249789 A1 | 10/2009 | Zuo et al. | |
| 2016/0032842 A1* | 2/2016 | Isono | F23R 3/14 |
| | | | 60/725 |
| 2017/0211807 A1 | 7/2017 | Graichen | |
| 2017/0350598 A1 | 12/2017 | Boardman | |

\* cited by examiner

INJECTOR WITH FAIRING AND ANNULAR PASSAGE FOR HYDROGEN-DRIVEN GAS TURBINE ENGINE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Present gas turbine engines use liquid hydrocarbon fuels (LHF). LHF is provided through a fuel supply system and introduced into the combustor by liquid injectors. The fuel supply system and liquid injectors are designed for handling and efficient burning of the LHF. For instance, as liquid is much denser than the air (gas) it is to be mixed with, it is necessary for the liquid injectors to atomize the LHF into tiny droplets in order to facilitate more uniform burning. More recently it has been proposed to utilize hydrogen ($H_2$) as a fuel.

SUMMARY

An injector according to an example of the present disclosure includes a convergent-divergent nozzle head, a fairing, a fuel nozzle, and an air nozzle. The convergent-divergent nozzle head has in fluid communication in series a convergent section, a throat, and a divergent section. The fairing extends through the convergent section and through the throat to define an annular passage between the fairing and the convergent-divergent nozzle head that has an outlet in the divergent section. The fuel nozzle has an annular fuel feed conduit that opens to the annular passage for providing hydrogen fuel. The gas nozzle is upstream of the convergent-divergent nozzle head for providing gas into the annular passage.

A gas turbine engine according to an example of the present disclosure includes a combustor section that has a combustion chamber, a hydrogen source, and an injector as in any of the foregoing embodiments, for introducing hydrogen from the hydrogen source and gas into the combustion chamber.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
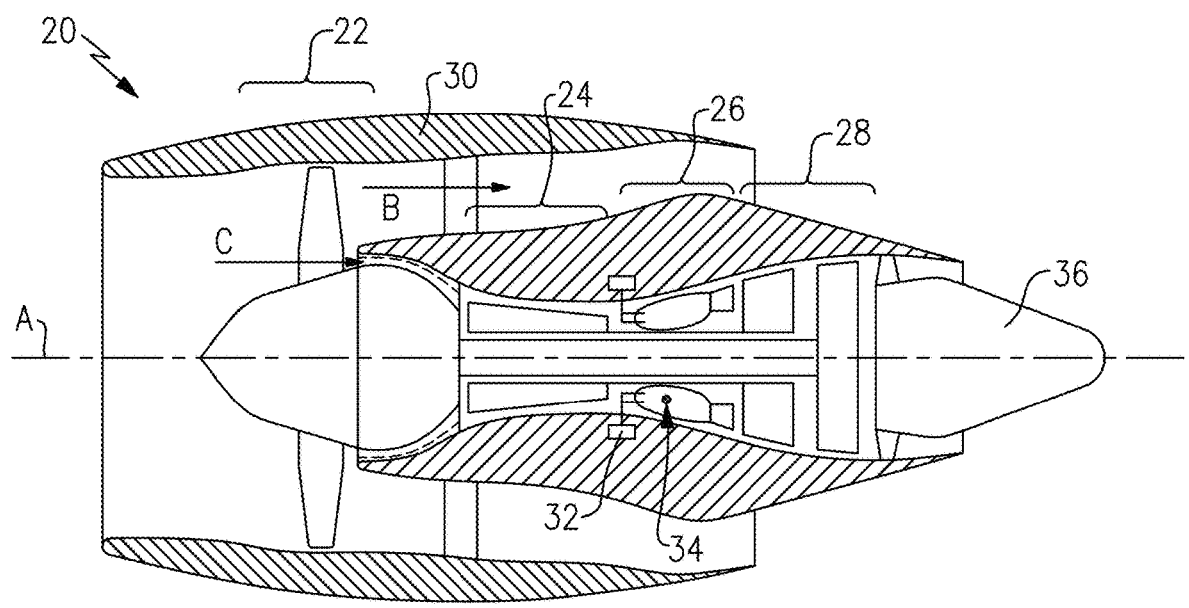
FIG. 1 illustrates a gas turbine engine.

FIG. 1 schematically illustrates a gas turbine engine 20. The example gas turbine engine 20 is a turbofan that generally incorporates a fan section 22, a compressor section 24, a combustor section 26, and a turbine section 28 arranged along an axis A. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air or other combustion gas is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller.

While present gas turbine engines use liquid hydrocarbon fuels (LHF), the engine 20 of the present disclosure is designed to use gaseous fuel, such as hydrogen (FIG. 2 "H2"), in the fuel system 32. In this regard, the fuel system 32 may carry liquid cryogenic hydrogen or gaseous hydrogen, both of which are provided to the combustor section 26 as gaseous hydrogen. A challenge to using hydrogen is that because it is a gas, its handling and combustion properties differ from that of LHF. For instance, hydrogen does not require atomization like a liquid, and hydrogen has higher flammability and different flame characteristics than LHF. Accordingly, injector nozzles that are designed for hydrogen are needed. In these regards, the engine 20 includes one or more injectors 38 for introducing the hydrogen fuel into the combustor section 26.

Figure 2:
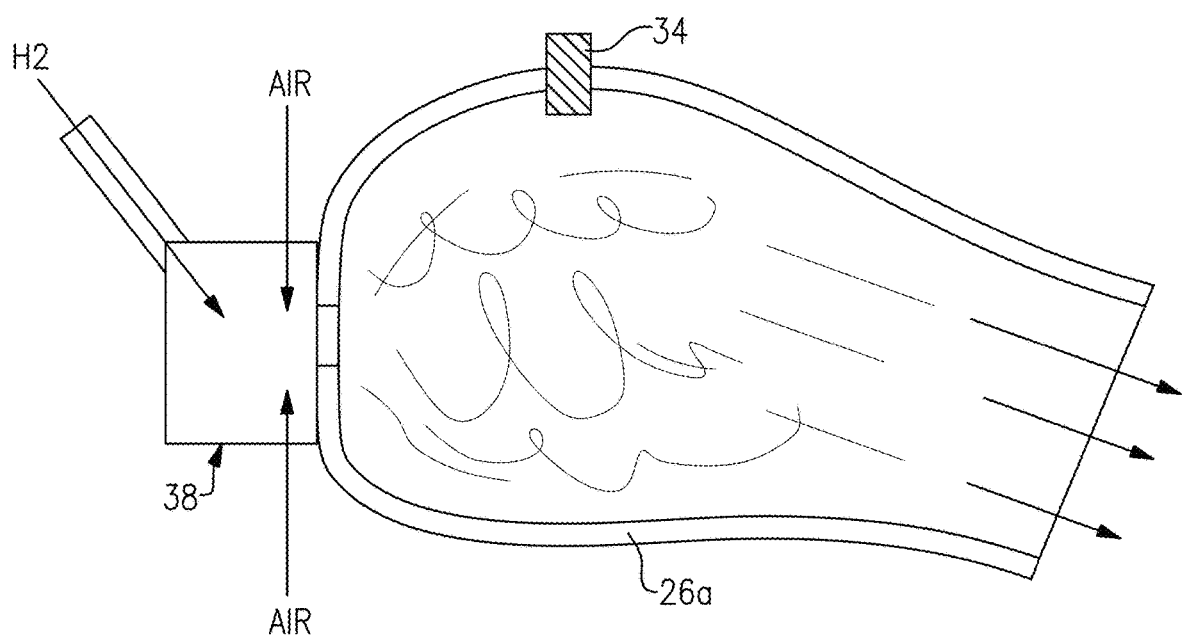
FIG. 2 illustrates an injector and combustor chamber of the engine.
Figure 3:
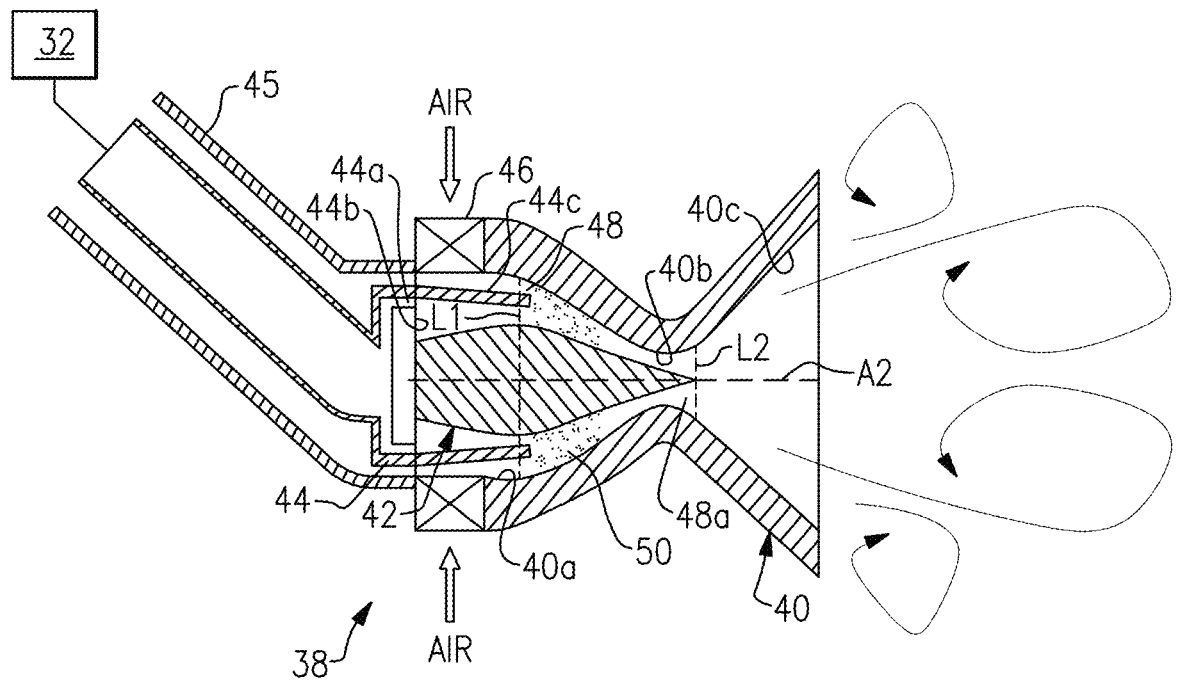
FIG. 3 illustrates an isolated view of an example injector.

As shown in FIG. 2, the injector 38 is arranged on a combustion chamber 26a of the combustor section 26 for introducing hydrogen and gas (e.g., air in the examples herein). FIG. 3 illustrates an isolated view of an example of the injector 38. The injector 38 includes a convergent-divergent nozzle head 40, a fairing 42, a fuel nozzle 44, and a gas nozzle 46. The convergent-divergent nozzle head 40 defines a central nozzle axis A2 and has in fluid communication in series a convergent section 40, a throat 40b, and a divergent section 40c. The fairing 42 extends along the nozzle axis A2, through the convergent section 40a and through the throat 40b to define an annular passage 48 between the fairing 42 and the convergent-divergent nozzle head 40. The annular passage 48 has an outlet 48a in the divergent section 40c.

The fuel nozzle 44 is connected with the fuel system 32 (hydrogen source) via feed conduit 45. The fuel nozzle 44 has an annular fuel feed conduit 44a that opens at a forward face 44b of the fuel nozzle 44 to the annular passage 48 for providing hydrogen fuel from the fuel system 32. The gas nozzle 46 is upstream of the convergent-divergent nozzle head 40 for providing air or other combustion gas into the annular passage 48, such as air from the compressor section 24. The hydrogen and air are mixed in the convergent-divergent nozzle head 40 and then injected into the combustor chamber 26a for ignition. A "conduit" as used herein is defined by one or more structures that together convey a fluid from one point to another. For example, a conduit conveying fluid from point A to point B may include one of, or a combination of: a tube, an aperture defined through a part of an engine, a filter, a pump, and so on, depending on the application and context as would be understood by a person of ordinary skill in the art reading the present disclosure.

In the example shown, the fairing 42 extends off of the forward face 44b of the fuel nozzle 44. The fairing 42 diametrically increases in size along the nozzle axis A2 from the forward face 44b to a first axial location L1 in the convergent section 40a. The fairing 42 thus provides a relatively large region for the hydrogen and air to initially diffuse and mix near the forward face 44b of the fuel nozzle 44. The feed conduit 44a distributes hydrogen through multiple distribution conduits 44c to locations axially beyond the axial location L1. Coupled with the convergence of the convergent section 40a, the diametric increase in the size of the fairing 42 up to the first axial location L1 serves to taper the annular passage 48 in the convergent section 40a, to facilitate the turning of the radial swirling air flow and the multiple distribution conduits 44c. The fairing 42 then diametrically decreases in size from the first axial location L1 to a second axial location L2 in the divergent section 40c. The angle of convergence of the convergent section 40a, however, is steeper than the diametric decrease such that the annular passage 48 continues to taper through the throat 40b to accelerate the hydrogen and air into the divergent section 40c.

To further facilitate uniform mixing of the hydrogen and air, the convergent-divergent nozzle head 40 includes an open-cell metallic foam 50 disposed in the annular passage 48. In this example, the foam 50 is disposed in the annular passage 48 between the first axial location L1 and the second axial location L2, upstream of the throat 40b. The cells of the foam 50 create a tortuous path for flow of the hydrogen and air to thereby promote mixing. For instance, the open-cell metallic foam 50 is formed of an alloy that has low susceptibility to hydrogen embrittlement, such as but not limited to, stainless steel or nickel alloy, and which is corrosion resistant and temperature resistant at the expected operating conditions. The foam 50 also serves as a flame arrestor, allowing feed flow of hydrogen and air but facilitating the prevention of flame propagation back through the throat 40b.

Figure 4:
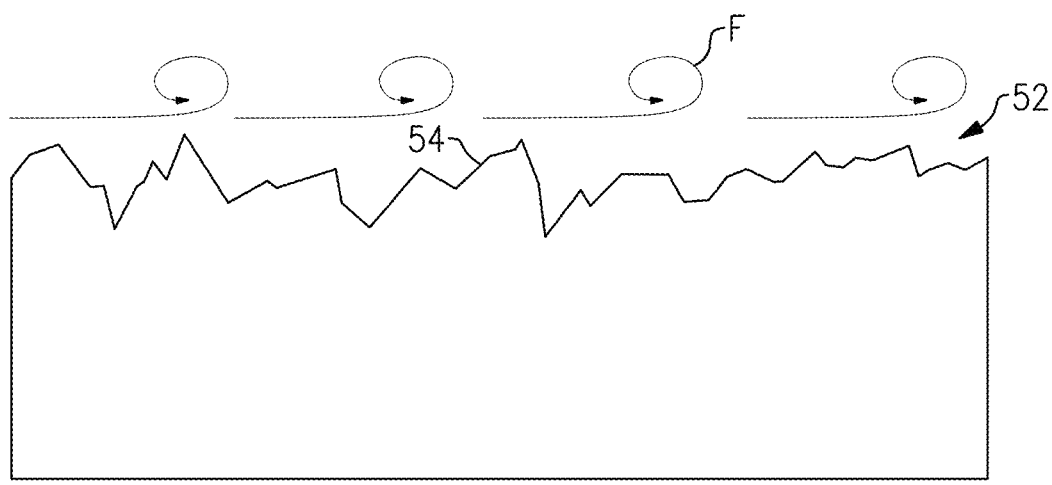
FIG. 4 illustrates a surface-treated surface to facilitate mixing.

In further examples, select surfaces of convergent-divergent nozzle head 40 and the fairing 42 that are in contact with hydrogen or air are surface-treated to further enhance mixing. FIG. 4 shows an example surface 52, which may be a surface of the convergent-divergent nozzle head 40 and/or the fairing 42. The surface 52 has been treated to have a surface roughness 54 of 100-300 Ra. The surface roughness 54 induces turbulent flow F, contributing to mixing of the hydrogen and air.

This disclosure may be further understood in view of the following examples. An injector 38 includes a convergent-divergent nozzle head 40 that defines a nozzle axis A2 that has, in fluid communication in series, a convergent section 40a, a throat 40b, and a divergent section 40c. A fairing 42 extends along the nozzle axis A2 through the convergent section 40a, and through the throat 40b to define an annular passage 48 between the fairing 42 and the convergent-divergent nozzle head 40. The annular passage 48 has an outlet 48a in the divergent section 40c. A fuel nozzle 44 has an annular fuel feed conduit 44a along the nozzle axis A2 and opens to the annular passage 48 for providing hydrogen fuel. There is a gas nozzle 46 upstream of the convergent-divergent nozzle head 40 for providing gas into the annular passage 48.

In a further example of the foregoing example, the convergent-divergent nozzle head 40 includes an open-cell metallic foam 50 disposed in the annular passage 48.

In a further example of any of the foregoing examples, the annular passage 48 tapers through the convergent section 40a.

In a further example of any of the foregoing examples, the fuel nozzle 44 includes a forward face 44b that faces the convergent-divergent nozzle head 40, and the fairing 42 extends off of the forward face 44b.

In a further example of any of the foregoing examples, the fairing 42 diametrically increases in size along the nozzle axis A2 from the forward face 44b to a first axial location L1 in the convergent section 40a.

In a further example of any of the foregoing examples, the fairing 42 diametrically decreases in size from the first axial location L1 to a second axial location L2 in the divergent section 40c.

In a further example of any of the foregoing examples, the convergent-divergent nozzle head 40 includes an open-cell metallic foam 50 disposed in the annular passage 48 between the first axial location L1 and the second axial location L2.

In a further example of any of the foregoing examples, the convergent-divergent nozzle head 40 includes a nozzle surface 52 and fairing 42 includes a fairing surface 52, and the nozzle surface and the fairing surface 52 have a surface roughness 54 of 100-300 Ra.

A gas turbine engine 20 according to an example of the present disclosure includes a combustor section 26 that has a combustion chamber 26a, a hydrogen source 32, and an injector 38 as in any of the foregoing examples.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An injector for a gas turbine engine comprising:
   a convergent-divergent nozzle head defining a nozzle axis and having in fluid communication in series a convergent section, a throat, and a divergent section;
   a fairing extending along the nozzle axis, through the convergent section, and through the throat to define an annular passage between the fairing and the convergent-divergent nozzle head, the annular passage having an outlet in the divergent section;
   a fuel nozzle having multiple feed conduits opening to the annular passage for providing hydrogen fuel, the fuel nozzle including a forward face facing the convergent-divergent nozzle head, and the fairing extends off of the forward face, the fairing diametrically increasing in size along the nozzle axis from the forward face to a first axial location in the convergent section, the fairing diametrically decreasing in size from the first axial location to a second axial location in the divergent section, and the multiple feed conduits opening at an axial location between the first axial location and the second axial location; and a gas nozzle upstream of the convergent-divergent nozzle head for providing gas into the annular passage.

2. The injector as recited in claim 1, wherein the convergent-divergent nozzle head includes an open-cell metallic foam disposed in the annular passage.

3. The injector as recited in claim 1, wherein the annular passage tapers through the convergent section.

4. The injector as recited in claim 1, wherein the convergent-divergent nozzle head includes an open-cell metallic foam disposed in the annular passage between the first axial location and the second axial location.

5. The injector as recited in claim 1, wherein the convergent-divergent nozzle head includes a nozzle surface and fairing includes a fairing surface, and the nozzle surface and the fairing surface have a surface roughness of 100-300 Ra.

6. A gas turbine engine comprising:
a combustor section having a combustion chamber;
hydrogen source; and
an injector for introducing hydrogen from the hydrogen source and air into the combustion chamber, the injector including
a convergent-divergent nozzle head defining a nozzle axis and having in fluid communication in series a convergent section, a throat, and a divergent section,
a fairing extending along the nozzle axis, through the convergent section, and through the throat to define an annular passage between the fairing and the convergent-divergent nozzle head, the annular passage having an outlet in the divergent section,
a fuel nozzle having multiple feed conduits opening to the annular passage for providing hydrogen fuel, the fuel nozzle including a forward face facing the convergent-divergent nozzle head, and the fairing extends off of the forward face, the fairing diametrically increasing in size along the nozzle axis from the forward face to a first axial location in the convergent section, the fairing diametrically decreasing in size from the first axial location to a second axial location in the divergent section, and the multiple feed conduits opening at an axial location between the first axial location and the second axial location, and
a gas nozzle upstream of the convergent-divergent nozzle head for providing gas into the annular passage.

7. The gas turbine engine as recited in claim 6, wherein the convergent-divergent nozzle head includes an open-cell metallic foam disposed in the annular passage.

8. The gas turbine engine as recited in claim 6, wherein the annular passage tapers through the convergent section.

9. The gas turbine engine as recited in claim 6, wherein the convergent-divergent nozzle head includes an open-cell metallic foam disposed in the annular passage between the first axial location and the second axial location.

10. The gas turbine engine as recited in claim 6, including a compressor section providing gas to the combustor section, a turbine section in fluid communication with the combustor section, and a fan coupled to be driven by the turbine section.

11. The injector as recited in claim 1, wherein the throat is axially between the first axial location and the second axial location.

* * * * *